United States Patent [19]

Walker

[11] Patent Number: 4,617,972
[45] Date of Patent: Oct. 21, 1986

[54] METHOD AND APPARATUS FOR WINDING AND INSERTING COILS IN A DYNAMOELECTRIC MACHINE STATOR CORE

[75] Inventor: Robert G. Walker, Ossian, Ind.

[73] Assignee: Industra Products Co. Inc., Fort Wayne, Ind.

[21] Appl. No.: 747,125

[22] Filed: Jun. 20, 1985

[51] Int. Cl.[4] ............................................ H02K 15/06
[52] U.S. Cl. ...................................... 140/92.1; 29/596
[58] Field of Search ........................... 140/92.1; 29/596

[56] References Cited

U.S. PATENT DOCUMENTS

| | | | |
|---|---|---|---|
| 3,714,973 | 2/1973 | Kieffer et al. ...................... | 140/92.1 |
| 3,722,063 | 3/1973 | Arnold . | |
| 3,913,629 | 10/1975 | Kieffer ............................... | 140/92.1 |
| 4,176,444 | 12/1979 | Walker . | |

FOREIGN PATENT DOCUMENTS

0154763 9/1985 European Pat. Off. .

Primary Examiner—Lowell A. Larson
Attorney, Agent, or Firm—Jeffers, Irish & Hoffman

[57] ABSTRACT

Coil winding and placer equipment arranged on an indexing table and rotatable between coil winding and coil insertion stations. Coils are wound on a coil winding form by means of a flyer and are stripped from the coil form onto an array of pivotable coil retainers. The coil retainer array is arranged outside of and concentrically with the coil insertion blades whereby the coil retainer array retains a complete set of stator coils. A stator core is positioned above the placer equipment and the retainers are pivoted inwardly thereby releasing the complete set of coils which are now held only by the insertion blades. The blades are moved upwardly into the bore of the stator core and a coil stripper is actuated to insert the coils into the axial slots of the stator core.

37 Claims, 17 Drawing Figures

METHOD AND APPARATUS FOR WINDING AND INSERTING COILS IN A DYNAMOELECTRIC MACHINE STATOR CORE

BACKGROUND OF THE INVENTION

This invention relates to an apparatus and method for winding coils and for inserting the coils in the slots of the stator core.

More specifically the invention pertains to an apparatus and method for winding stator coils of relatively thick wire, one coil at a time, to retain the completed coils on a placer tooling apparatus while winding of the complete set of stator coils is completed and then to insert all of the coils simultaneously into the slots of a stator core. The invention is particularly adapted for winding and placement of alternator stator coils for automotive applications.

Alternators for automotive applications require stator coils of relatively heavy wire. While equipment for winding coils and inserting coils into the axial slots of stator cores is well known in the prior art, several problems have been encountered in applying prior art coil winding and inserting equipment to the construction of alternator stators. The heavy wire of which the coils are constructed has a diameter which is almost equal to the size of the gaps which separate the stator core teeth. Conventional insertion equipment has utilized coil inserting blades which have lips to shield the sharp edges of the teeth adjacent the gaps so that the wire, during insertion through the iron gaps, is not damaged. However, when coils are constructed of such heavy wire, the protective blade lips close off too much of the iron gaps and thereby prevent the wire from entering the gaps, or alternatively cause damage to the wire if it is forced through the gaps during insertion.

Furthermore, prior art placer tooling has used slender blades which span only a single tooth each. The slender blades are distorted by the insertion of relatively heavy wire into the stator core slots, thereby preventing proper alignment of the stator core slots with the coils as they are being inserted and resulting in damaged coils.

Another problem with prior art coil winding and insertion equipment has been that coils constructed of heavy wire are distorted during winding. As the successive coils are being wound, one coil at a time, the completed coils must be retained on the insertion blades as the equipment completes winding of the complete set of coils and prior to insertion of the coils into the stator core. As the equipment indexes after completion of each coil, the relatively heavy wire is pulled so tightly against the blades that the shape of the coil is distorted. Additionally the wire may be damaged as it is drawn up tightly against the outsides of the blades.

It is therefore desired to provide insertion equipment wherein retaining devices are employed for retaining the completed coils and wherein the retaining devices are located outside the insertion blades so that the wire, as it is pulled from a completed coil to the next coil to be formed, does not exert distorting forces on the coil blades and the completed coil retains its desired shape.

In some prior art equipment clamping mechanisms have been provided to clamp the wire after completion of a coil, thereby preventing coil distortion since the wire is pulled against the clamping force as the equipment is indexed to the next coil forming station. These clamping arrangements have several disadvantages. First of all the clamps may cause the wire to be damaged or nicked because of the relatively high clamping forces necessary. Secondly because a fairly long length of wire is required to be held by the clamp, loops of wire are formed between successive coils. These loops of wire need to be tucked in after insertion of the coils into the stator core. Not only is the need for such wire loops costly in terms of materials but, most importantly, the loops require additional labor to handle, add cycle time to the process and add extra weight to the stator.

What is therefore desired is the elimination of clamping devices and the provision of equipment wherein no clamps are necessary to clamp the wire after completion of each coil. It is furthermore desired to eliminate the need for loops of wire between successive coils and to eliminate damage to the coil wire as it is being wound.

Prior art equipment has generally utilized bore blocks for insertion of coils into alternator stator cores. Such devices are cylindrical in shape and are sized to fit into the stator core bore. The bore block includes radial coil holding slots arranged around its periphery. After the bore block is inserted into the stator core the coils are ejected from the holding slots and are inserted into the stator slots.

In today's energy conscious society there is a constant need to reduce the size and weight of automobiles and to conserve space and weight in automobile engine compartments. Manufacturers of automotive equipment have therefore been under pressure to reduce the weight and size of components to be housed in the engine compartments. It is therefore desired to make very compact alternators. The reduction in the size of alternators has been carried to the point where the coil holding slots in bore blocks have reached their coil holding capacity. Bore blocks can therefore not be further reduced in size and alternators cannot be further decreased in diameter. It is therefore desired to provide insertion equipment for inserting alternator stator coils into stator cores without the use of a bore block so that the diameter of the alternators can be further reduced.

SUMMARY OF THE INVENTION

The present invention overcomes the disadvantages of the above described prior art coil winding and placing apparatus by providing an improved coil winding and inserting apparatus and a method for winding coils and inserting the coils into dynamoelectric machine stator cores.

The invention, in one form thereof, provides a coil winding and inserting apparatus including a coil retainer arranged outside of the coil insertion blades for retaining completed coils after they are wound and stripped from the winding form and for selectively releasing those coils for insertion into the stator core slots.

The invention further provides, in one embodiment thereof, coil winding and inserting equipment arranged on an indexing table and rotatable between coil winding and a coil insertion stations. Coils are wound on a coil winding form by means of a flyer and are then stripped from the coil form onto an array of pivotable coil retainers. A circular array of coil insertion blades is provided, each blade spanning several stator core teeth. The coil retainer array is arranged outside of and concentrically with the coil insertion blades whereby each blade and coil retainer combination can hold a completed coil after the coil is wound and stripped from the coil form.

The coil insertion blades and retainers are indexed after receiving a completed coil so that the next blade and retainer combination is positioned for receiving the next completed coil. After all the coils have been wound and stripped onto the coil placer tooling the table is indexed so that the completed set of stator coils is positioned for insertion into a stator core. The stator core is positioned above the placer equipment and the retainers are pivoted inwardly thereby releasing the coils so that they are held only by the coil insertion blades. The blades are now moved upwardly into the bore of the stator core. A wedge inserter and coil stripper are actuated for inserting the wedges into the stator core slots and for simultaneously stripping the coils from the blades and inserting them outwardly into the axial slots of the stator core.

One advantage of the instant invention is that heavy wire can be used to wind the stator coils for small diameter alternators and that these coils can be inserted into the axial slots of an alternator stator core.

An additional advantage of the present invention is that the coil retainers which are located outside of the insertion blades of coil placing equipment retain the shapes of the coils as the coils are being wound.

Another advantage of the present invention is the elimination of clamping devices to clamp the sections of wire located between adjacent coils.

A further advantage of the present invention is that the likelihood of damage to the coil wire is reduced.

Yet another advantage of the present invention is the shorter cycle time required for winding and inserting coils.

Still another advantage of the present invention is the elimination of loops of wire between adjacent coils thereby eliminating wasted wire and saving additional space and weight in the alternator.

A yet further advantage of the present invention is the achievement of good blade alignment by permitting the blades to span several teeth of the stator core.

A still further advantage of the present invention is the ability to insert heavy wire into a stator core through small stator core gaps while retaining good alignment of the blades and preventing damage to the wire as it is being inserted into the stator core slots.

The invention, in one form thereof, comprises an apparatus for winding and inserting coils in the slots of a stator core and comprises coil winding tooling and coil placer tooling. The coil winding tooling includes a coil form and a flyer for winding coils on the winding form and a coil form stripper the coils from the form. The coil placer tooling includes a plurality of blades and a coil retainer disposed radially outwardly outside of the blades for retaining thereon coils stripped from the coil form. The coil retainer is selectively collapsible for selectively releasing the retained coils. A coil stripper is operatively associated with the blades for stripping the coils from the blades and for inserting the coils into the slots of the stator core.

The invention, in one form thereof, further provides an apparatus for placing prewound coils into the slots of a stator core comprising a plurality of blades arranged in a circular array and a coil retainer operatively associated with the array and located concentrically with and outside of the array for retaining the prewound coils. The retainer is collapsible for releasing the retained coils. A stripper is disposed radially inwardly of and concentrically with the array for stripping the coils from the blades and for inserting the coils into the stator core slots.

The invention, in one form thereof, still further provides an apparatus for winding and placing coils into selected slots of a stator core and comprising an indexing table movable with respect to a coil winding and a coil inserting station. Coil winding tooling is operatively disposed at the coil winding station and includes a coil winding form, a flyer for winding coils on the coil winding form, and a coil form stripper for stripping the coils from the form. Rotatable coil placer tooling is provided and includes a circular array of coil insertion blades and a circular array of coil retainers disposed concentrically with and outside the blade array. The placer tooling is operatively disposed with respect to the coil form to receive stripped coils from the coil form. The coil placer tooling is rotatably indexed after receiving a stripped coil to dispose an empty coil retainer below the coil form for receiving a further stripped coil. The table indexes the placer tooling to the inserting station when a complete set of stator coils has been stripped onto the retainers. The retainers are collapsible to release the retained coils and a coil stripper is operative to strip the released coils from the blades and to insert the coils into the slots of a stator core.

The invention in one form thereof, comprises a method for inserting prewound coils into the slots of a stator core by retaining the coils on a plurality of circumferentially arranged blades and a coil retainer. The coil retainer is then collapsed to release the coils and the coils are stripped from the blades and inserted into the stator core slots.

The invention, in one form thereof, further provides a method for winding and inserting coils into the slots of a stator core comprising winding the coils on a coil form and stripping the coils from the coil form onto a retainer. The retainer comprises a circular array of blades and a collapsible coil retainer form disposed circumferentially with and outside the array. A stator core is then arranged coaxially with and adjacent to the blades and the retainer form. The coil retainer form is collapsed radially inwardly toward the blades to release the coils and the blades are moved axially into the bore of the stator. The stripper is then moved axially through the array of blades and the core to strip the coils from the blades and to insert the coils into the stator core slots.

One object of the present invention is to provide an apparatus and method for winding and inserting coils constructed of heavy wire into a small diameter alternator stator core.

Another object of the present invention is to provide apparatus for winding and inserting coils constructed of heavy wire by using retainers located outside the insertion blades for retaining the coils.

A further object of the present invention is to eliminate prior art clamping devices to clamp the sections of wire between adjacent coils.

Yet another object of the present invention is to shorten the cycle time necessary for winding and inserting coils into a stator core.

Yet a further object of the present invention is to reduce the likelihood of damage to the wire used to wind coils for insertion into stator cores.

Still another object of the present invention is to eliminate the need for loops of wire between adjacent coils of an alternator stator.

A yet further object of the present invention is to provide good insertion blade alignment despite the use of heavy wire in the winding and insertion of stator core coils.

A still further object of the present invention is to permit the insertion of heavy wire coils into small iron gaps of a stator core.

An additional object of the present invention is to provide a method for winding and inserting coils constructed of heavy wire into the stator core of a small diameter alternator.

BRIEF DESCRIPTION OF THE DRAWINGS

The above mentioned and other features and objects of this invention and the manner of obtaining them will become more apparent and the invention itself will be better understood by reference to the following description of an embodiment of the invention taken in conjunction with the accompanying drawings, wherein.

Corresponding reference characters indicate corresponding parts throughout the several views of the drawings. The exemplifications set out herein illustrate a preferred embodiment of the invention in one form thereof, and such exemplifications are not to be construed as limiting the scope of the disclosure or the scope of the invention in any manner.

DESCRIPTION OF THE PREFERRED EMBODIMENT

Figure 1:
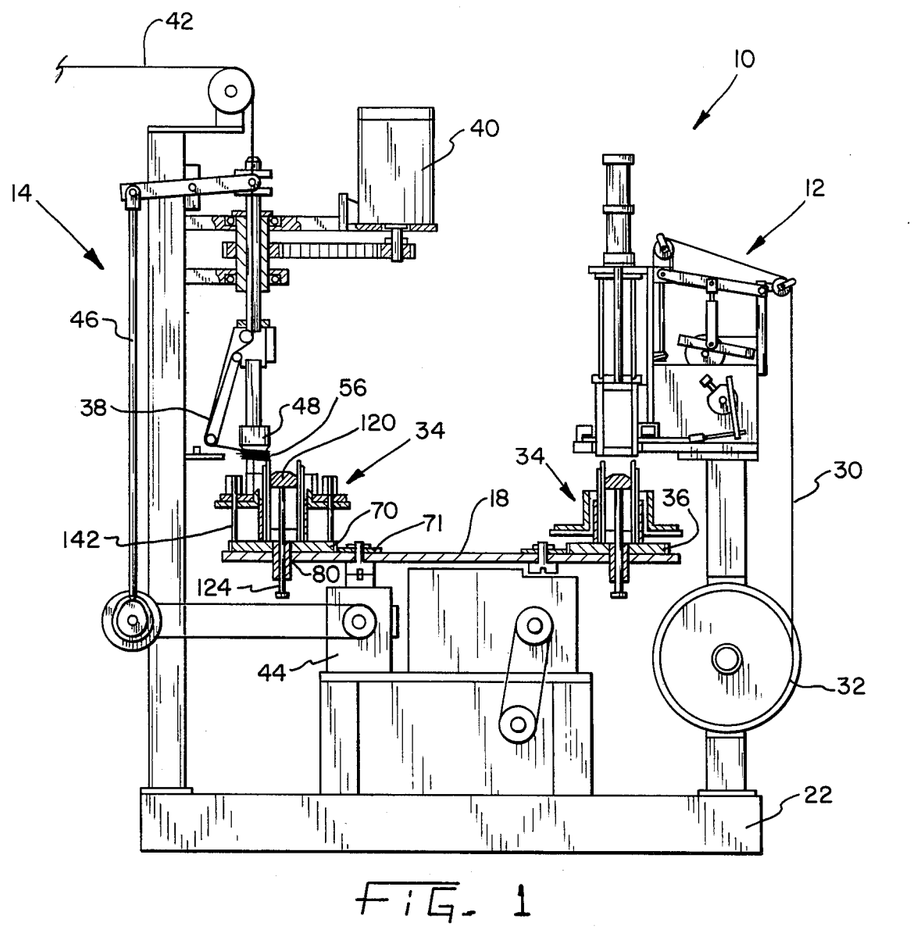
FIG. 1 is a side elevational view of the winding and wedge transfer stations of a coil winding and inserting apparatus constructed in accordance with the invention.
Figure 2:
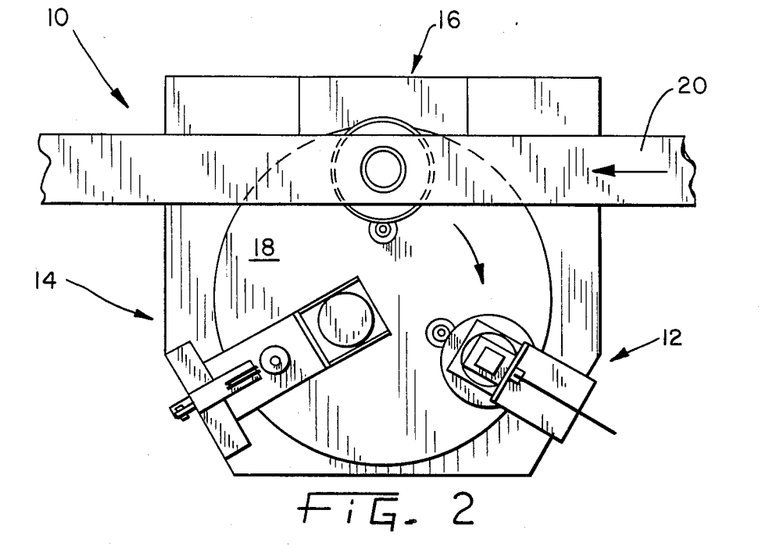
FIG. 2 is a plan view of the coil winding and insertion apparatus FIG. 1.
Figure 3:
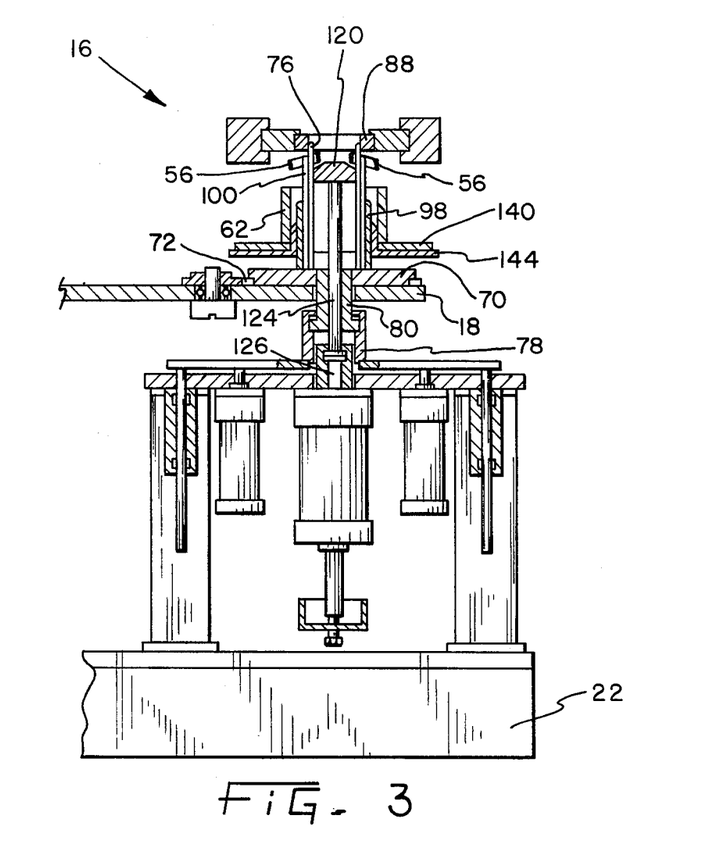
FIG. 3 is a side elevational view of the coil insertion station of the coil winding and insertion apparatus of FIG. 1.

Referring to FIGS. 1, 2 and 3, what is shown is a coil winding and inserting apparatus (10) including a wedge transfer station (12) a coil winding station (14) and a coil insertion station (16). A rotatable index table (18) rotates in the direction of the arrow shown in FIG. 2 for locating the coil placer tooling (34) at the appropriate stations. A conveyor (20) is provided for conveying stator cores to and from coil insertion station (16). A base (22) supports the entire apparatus and includes conventional actuating equipment to operate the apparatus.

Figure 4:
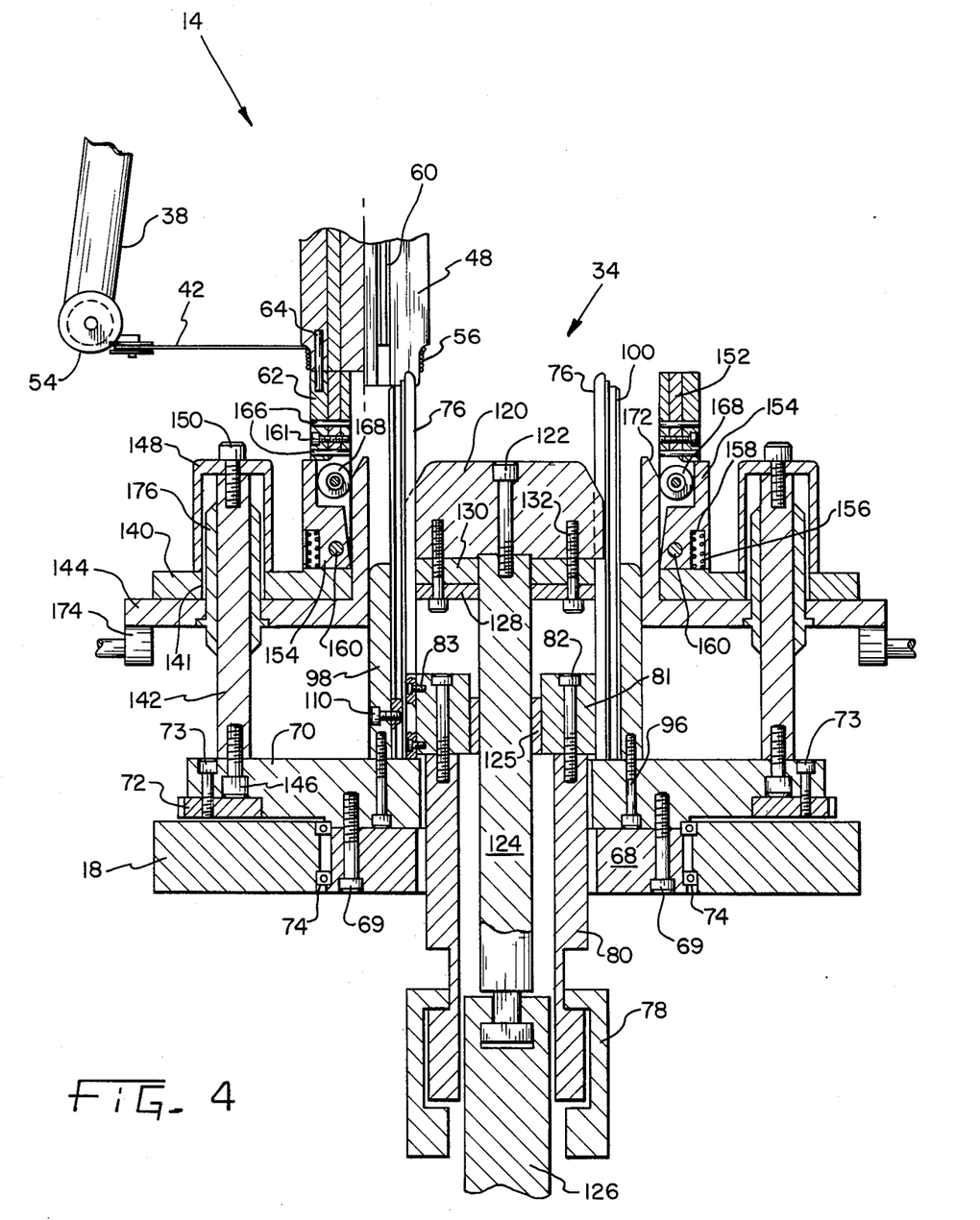
FIG. 4 is a partial enlarged elevational view of the upper placement tooling according to the present invention during the coil winding operation.
Figure 6:
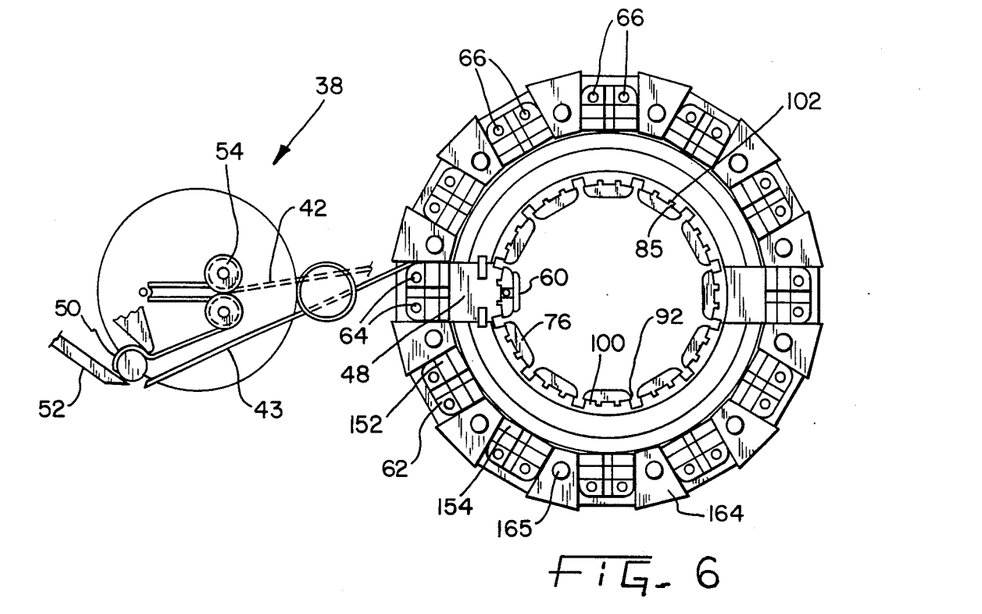
FIG. 6 is an enlarged plan view of the coil winding station of FIG. 4 and showing the lead wire from last set of coils cut with the lead clamped to begin winding the next set of coils.

In the wedge transfer station a coil (32) of wedge material (30) is provided for supplying wedges which are inserted in the placer tooling for later insertion into the stator core slots as will be further explained hereinafter. Coil placer tooling (34), located on tool mounting plate (36), is transported by index table (18) to coil winding station (14). A flyer assembly (38) is provided at the coil winding station and is powered by an electric motor (40) for winding coil wire (42) from a wire spool (not shown) onto coil winding form (48). Linkage (46) is provided for raising and lowering coil winding form (48) and for positioning coil winding form (48) adjacent coil placer tooling (34) as shown in FIG. 1. An electric motor (not shown) drives indexer (44) and supplies the driving power to raise and lower coil form (48) as well as index tooling (34). As best illustrated in FIGS. 1, 4 and 6, wire (42) is guided by wire pulleys (54) of flyer assembly (38) and a clamp (50) is provided for selectively clamping the wire. A cutter (52) is provided for severing the wire after a complete set of coils is wound. After wire (42) is cut, lead (43) is located as shown in FIG. 6.

Figure 5:
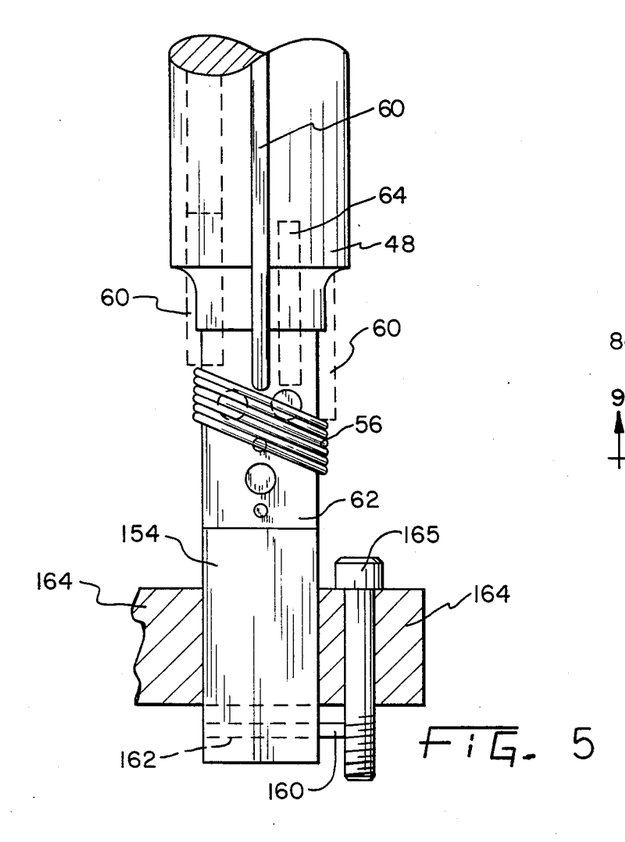
FIG. 5 is an enlarged end view of the coil winding form and coil retainer of FIG. 4 during the process of stripping a completed coil from the coil form onto the retainer form.
Figure 7:
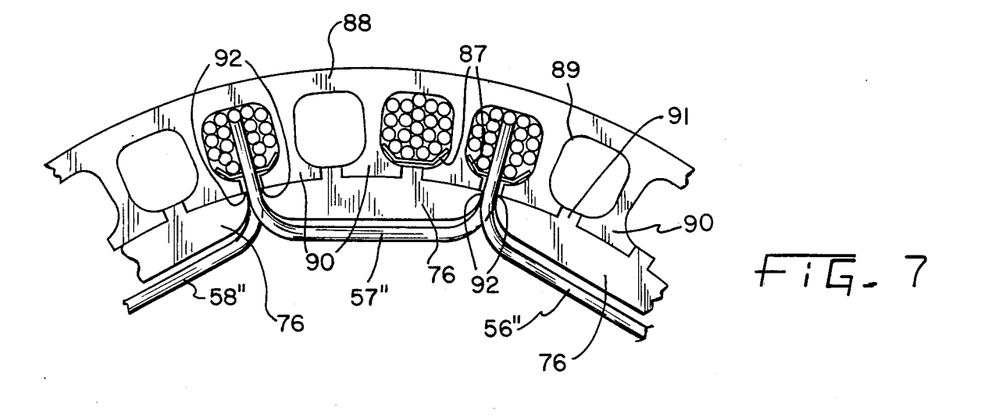
FIG. 7 is an enlarged plan view of a section of the stator after insertion of the coils into the slots thereof.

Referring now to FIG. 5, which is a partial enlarged end view of coil winding station (14), a coil retainer form (62) is shown located in contact with coil winding form (48). Dowel alignment pins (64) are provided for aligning coil winding form (48) with coil retainer form (62). A coil form stripper (60) is provided which includes three stripper elements, one each of which is located on each side of coil form (48) outside of blade elements as further explained hereinafter. Coil form stripper elements (60) strip coil (56) from coil form (48) after coil (56) is completely wound on coil form (48) and place coil (56) on coil retainer form (62). As clearly seen in FIG. 5, coil stripper elements (60) located on the right side of coil form (48) push the coil turns down further than coil stripper elements (60) located on the right side of coil form (48). Coil (56) is therefore oriented at an angle with respect to a horizontal plane and is received on coil retainer form (62) with that orientation. This angled orientation is necessary because the winding apparatus will successively wind the coils for a complete set of stator coils (55) for simultaneous insertion into the stator core. After each coil (56) is wound and stripped from coil winding form (48) onto coil retainer form (62), placer tooling (34) will be indexed and rotated to align an empty coil retainer form (62) adjacent coil winding form (48). After stripping, the adjacent coils will be in contact with each other in the gaps between retainer elements (62). If the coils are not oriented angularly as shown, the complete set of stator coils (55) would consist of stair-stepped coils and would take up to much vertical space and would also be difficult to insert into a stator core. As best seen in FIG. 7 which diagrammatically shows a portion of a complete set of stator coils (55), by angularly orienting the individual coils (56, 57 and 58) the complete set of coils (55) will form a cylinder coil array with a relatively small axial (vertical) dimension. It should also be noted that coil (57), which is the first coil wound, has an initial orientation shown at (57'). After the last coil (58) of coil set (55) is wound it will force the left side of coil (57) down so that coil (57) assumes the position shown at (57'').

Referring now to FIGS. 1 and 4, placer tooling (34) further comprises a tool mounting plate support (68) which is fastened to tool mounting plate (70) by means of bolts (69). Index table (18) rotatably supports tool mounting support plate support (68) by means of ball bearings (74). Placer tooling (34) is therefore rotatable on index table (18). Placer tooling (34) is rotatably driven by means of annular drive gear (72) which is in turn driven by driver gear (71) and an electric motor through indexer (44).

As best seen in FIGS. 4 and 6, coil insertion blades (76) are arranged in a circular array. The blades are attached to blade holder (81) by means of bolts (83). Blade holder (81) is secured to blade pusher tube (80) by means of bolts (82). Blade pusher tube (80) is actuated by blade pusher (78) which in turn is actuated by blade cylinders as further explained hereinafter. The equipment also includes means (not shown) to permit the use of stator cores having different stack heights.

Figure 8:
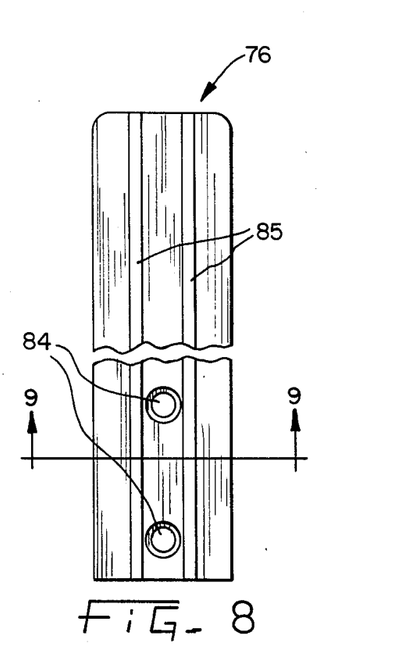
FIG. 8 is an enlarged side view of an insertion blade.
Figure 9:
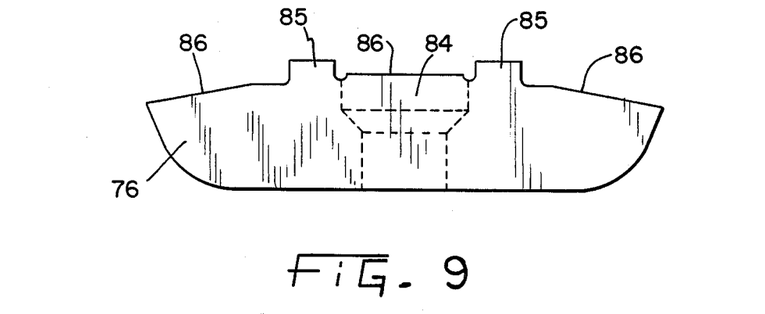
FIG. 9 is an enlarged cross-sectional view of a coil insertion blade taken along line 9—9 of FIG. 8.

Referring now to FIGS. 7, 8 and 9, blades (76) are shown including apertures (84) for receiving bolts (83) to fasten blades (76) to blade holder (81). It can also be seen that blades (76) include two alignment keys (85) which cooperate with gaps (91) between adjacent stator core teeth (90) for maintaining blades (76) in aligned orientation during insertion of the coils into slots (89) of stator core (88). Each blade (76) spans three stator teeth (90) and, because of their relatively wide dimension, blades (76) are sufficiently rigid to permit the use of heavy coil wire (42) without causing misalignment of blades (76) with teeth (90). Additionally, the use of alignment keys (85) retains alignment of blades (76) during insertion of the coils into stator core (88). It should also be noted that, as distinguished from prior art coil insertion blades which had lips to overhang the stator core teeth for protecting the coil wire and for supporting the blades, blades (76), according to the instant invention, are not provided with such lips. The purpose of the present arrangement is to permit the blades to overhang the stator core teeth only very slightly to take up very little space in gaps (91) whereby sufficient clearance is provided for the relatively heavy wire to enter stator core gaps (91) during coil insertion while still protecting the coils from damage from the sharp edges of the stator teeth. This can best be seen with reference to FIG. 7 wherein the overhang (92) of blades (76) into gaps (91) is clearly shown.

Figure 10:
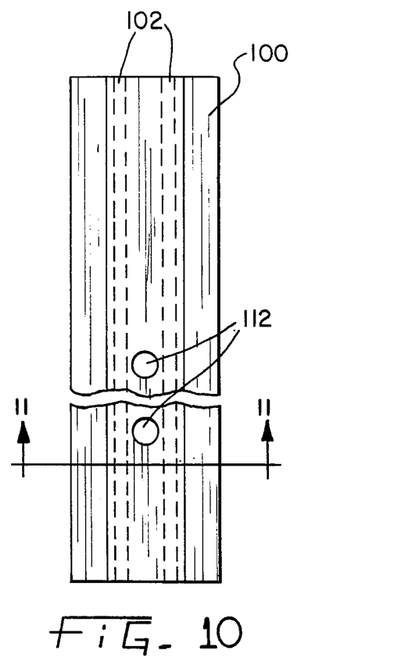
FIG. 10 is an enlarged side view of a wedge guide.
Figure 11:
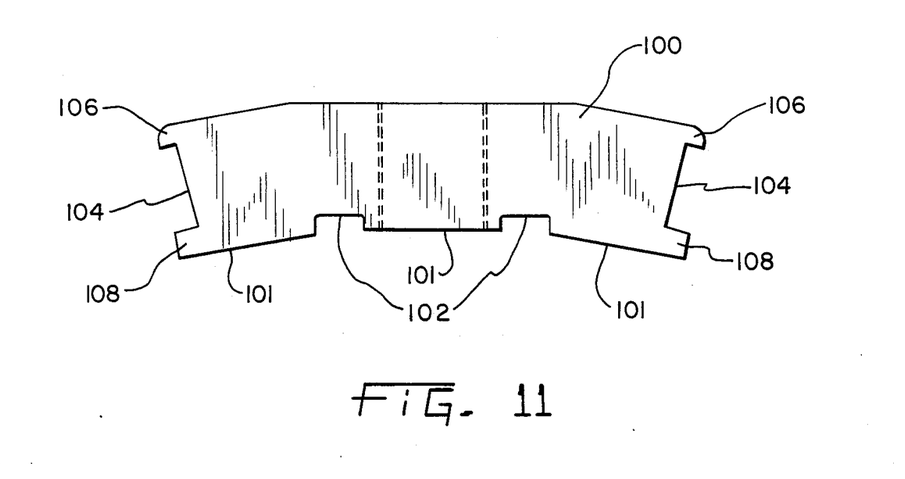
FIG. 11 is an enlarged cross-sectional view of a wedge guide taken along line 11—11 of FIG. 10.

Referring further to FIGS. 4, 7, 8 and 9 cylindrical placer tooling housing (98) surrounds blades (76) and wedge guides (100). Bolts (96) secure housing (98) to tool mounting plate (70). By referring to FIGS. 10 and 11 it can be seen that wedge guides (100) include surfaces (101) which mate with blade surfaces (86). Keyslots (102) mate with blade alignment keys (85) to provide for a rigid coil placer tooling structure for supporting the coils as they are stripped from coil form (48) and onto retainer forms (62) and blades (76). Wedge guides (100) further include a pair of wedge guide slots (104) formed by lips (106) and (108). Slots (104) mate with wedge guide slots (104) of adjacent wedge guides to provide a rectangular slot for the insulating wedges (87). This is best illustrated in FIG. 6 which shows that wedge guide slots (104) form slots which align with stator core slots (89) when stator core (88) is placed in its coil inserting position. Wedges (87) are received in these slots so that they can be inserted into stator core slots (89) at coil insertion station (16) as further explained hereinafter.

It can also be seen that the shape of wedge guides (100) is somewhat arcuate so that a complete set of wedge guides (100) forms a cylindrical structure as best shown in FIGS. 4 and 6. Wedge guides (100) are secured to placer tooling housing (98) by means of bolts (110) which are disposed in wedge guide bolt apertures (112). The lower tips of wedge guides (100) and the bottom surface of placer tooling housing (98) rest on tool mounting plate (70). Therefore the entire assembly comprising tool mounting plate support (68), tool mounting plate (70), placer tooling housing (98), and wedge guides (100) are axially stationary. As distinguished therefrom, blades (76) are axially movable by movement of the blade pusher tube (80) and blade holder (82). The entire assembly comprising tool mounting plate (70) placer tooling housing (98), wedge guides (100), and blades (76) is rotatable and is indexed by means of annular drive gear (72).

Figure 12:
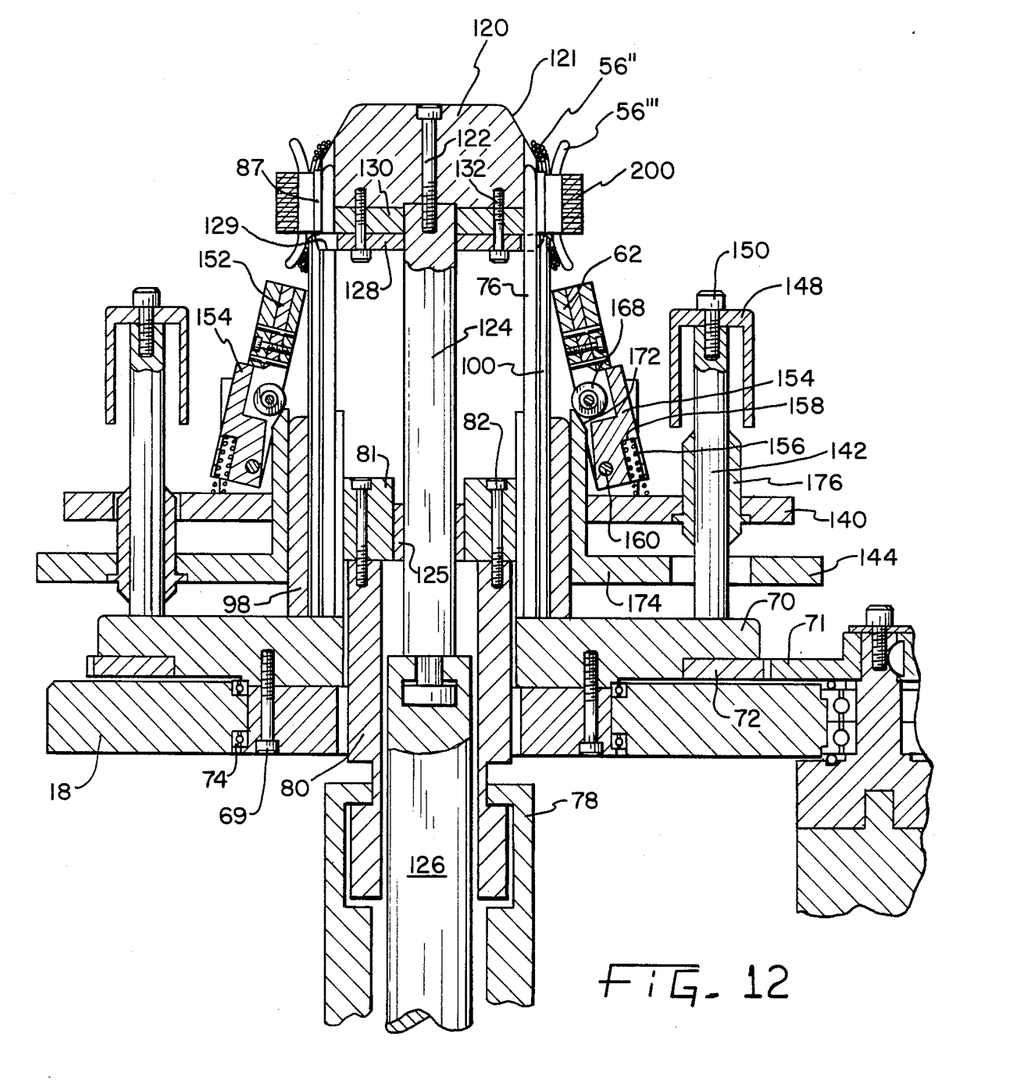
FIG. 12 is a partial enlarged elevational view of the upper placement tooling according to the present invention during the coil insertion operation.

Continuing further with reference to FIG. 4, stripper (120) is shown mounted on stripper pusher rod (124) and is secured thereto by means of stripper bolt (122). Stripper (120) includes an angled frustoconical surface (121) to aid in inserting coils into stator core slots (89) as further explained hereinafter. Bushing (125) aligns stripper pusher rod (124) with blade holder (82) and provides the bearing therefor. Stripper pusher (126) moves stripper (120) axially during the stripping operation. The stripper is of conventional construction and includes fingers which are slidably received in the gaps between adjacent blades (76) whereby the fingers strip the coils from blades (76) during the stripping operation and insert the coils outwardly into the stator core slots (89). Wedge pusher (128) is provided and is spaced from stripper (120) by means of wedge pusher spacer (130). The assembly of stripper (120), wedge pusher (128), and wedge pusher spacer (130), is secured together by means of bolts (132). As best illustrated in FIG. 12, wedge pusher (128) includes finger elements (129), which are slidably disposed in the gaps between adjacent blades (76) and wedge guides (100) for pushing the wedges upwardly into stator core slots (89) during the coil and wedge insertion operation.

Figure 13:
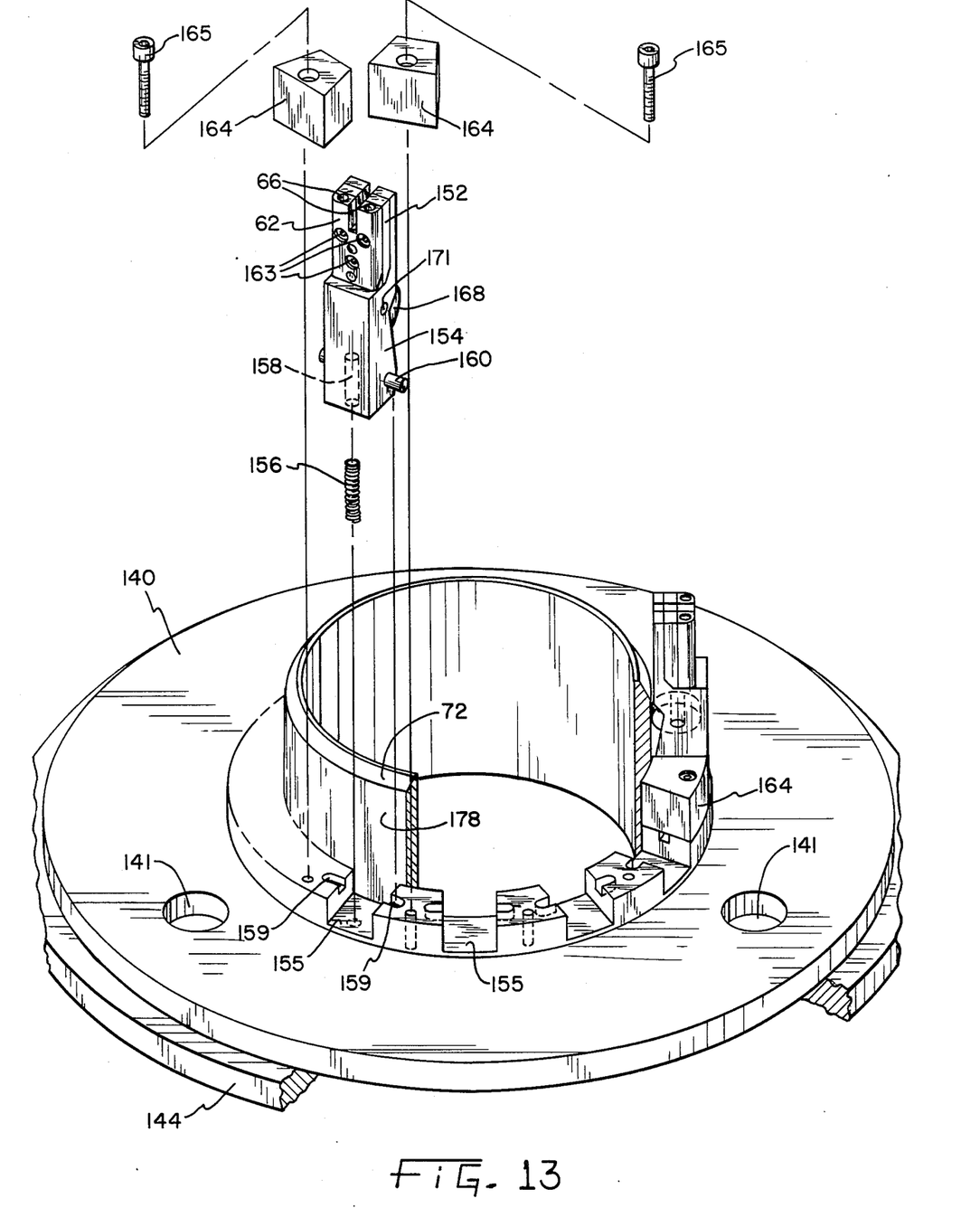
FIG. 13 is an exploded perspective view of the coil retainer collapse assembly.
Figure 14:
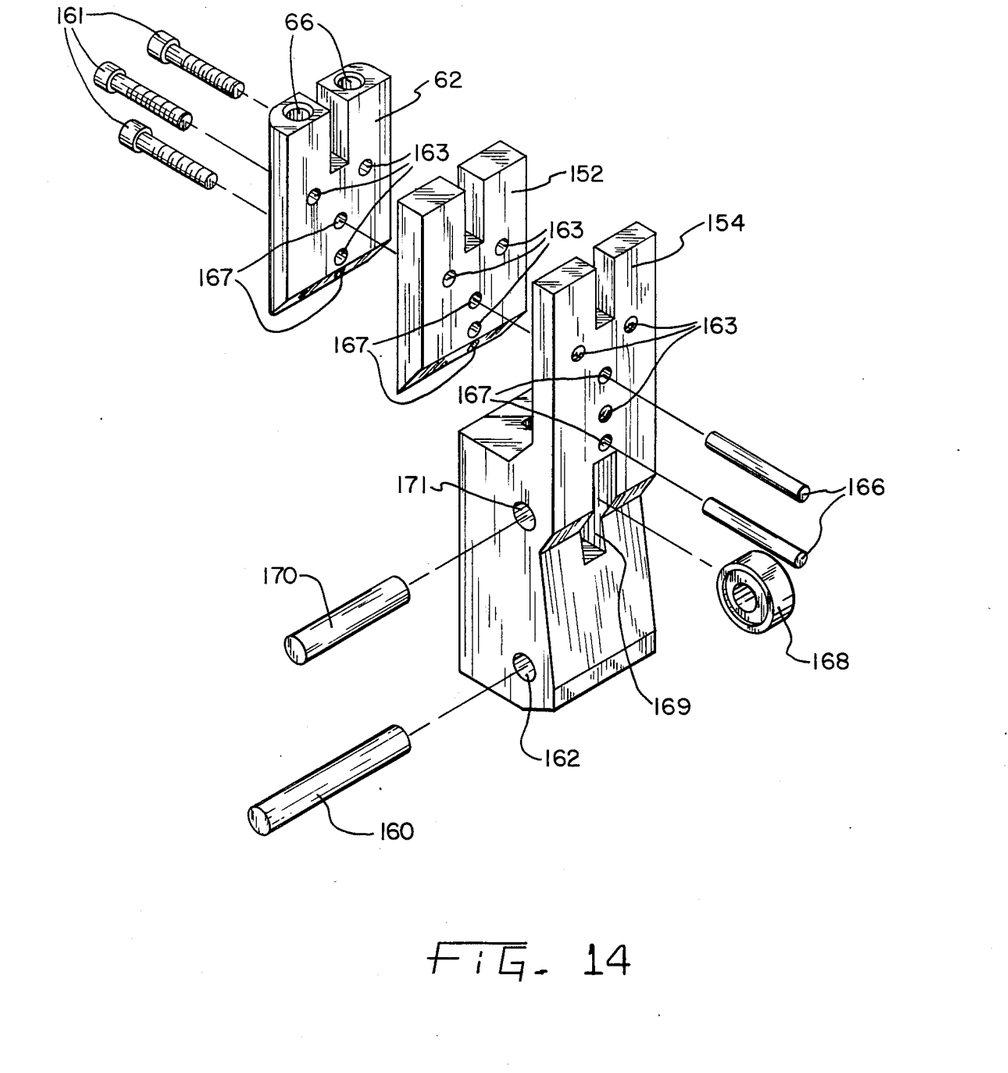
FIG. 14 is an exploded perspective view of the coil retainer assembly.

Referring further to FIGS. 4, 13 and 14, a coil retainer assembly is shown including retainer form support plate (140). Plate (140) is circular and includes apertures (141) for receiving a plurality of die shafts (142), six of which are preferably provided. Die shafts (142) are secured to tool mounting plate (70) by means of bolts (146). A retainer form collapse ring (144) is disposed below retainer form support plate (140). Retainer form support stops (148) are provided for limiting the amount of upward movement of retainer form support plate (140) during its upward travel. Bolts (150) secure retainer form support stops (148) to die shafts (142). Retainer assembly includes retainer form supports (154) which are pivotably secured to retainer form support plate (140) by means of pivot pins (160) which are received in slots (159). Retainer form supports (154)

are received in cavities (155) in retainer support plate (140). Springs (156) are received in spring cavities (158) in retainer form supports (154) for causing retainer form supports (154) to pivot when retainer form collapse ring (144) is moved downwardly, as further explained hereinafter. The retainer assembly also includes retainer form spacers (152) for spacing coil retainer forms (62) from the upstanding portions of retainer form supports (154). Bolts (161) are received in apertures (163) to secure spacers (152) and retainer forms (62) to retainer form supports (154). Pins (166) are received in apertures (167) for aligning the parts of the retainer assembly prior to securing them together with bolts (161). As best illustrated with reference to FIGS. 6 and 13 guide blocks (164) are located between coil retainer form support (154). Bolts (165) secure guide blocks (164) to the retainer form support plate (140). Pins (160) are received in slots (159) and in apertures (162) in retainer form supports (154) for pivotably supporting retainer form support (154). Pins (160) are retained in slots (159) by guide blocks (165).

Retainer rollers (168) are secured in cavities (169) of retainer form supports (154) by means of pins (170) which are received in apertures (171). Rollers (168) cooperate with a camming surface (172) of retainer form collapse ring (144). As best seen in FIG. 4 a cam actuator (174) is provided for selectively camming collapse ring (140) upwardly and downwardly. Six bearing devices (176) are provided in apertures (141) in collapse ring (144) for providing sleeve bearings for die bushings (142). Three of the bearing devices (176) are attached to ring (140) and the other three bearing devices (176) are attached to ring (144).

As best illustrated in FIGS. 4, 12, 15A and 15B the operation of the apparatus is as follows. Coils are wound on coil form (48) by means of flyer (38). Typically five to eleven turns are wound for one coil. During the winding operation placer tooling (34) is spaced adjacent coil winding form (48) so that coil retainer form (62) is in contact with coil winding form (48) as illustrated in FIG. 5. Coil retainer forms (62) are oriented vertically and dowel pins (64) are received in apertures (66) in coil retainer forms (62) for alignment of coil winding form (48) with a retainer form (62). Roller (168) engages the vertical outside surface (178) of retainer form collapse ring (144) as illustrated in both FIGS. 4 and 15A. After the formation of each coil (56), flyer (38) is stopped and stripper elements (60) strip coil (56) from coil form (48) and onto a blade (76) and a coil retainer form (62). After coil (56) is stripped from coil form (48), placer tooling (34) will index by rotation of tool mounting plate (70) driven by annular drive gear (72). An empty coil retainer form (62) and blade (76) will now be disposed adjacent coil winding form (48). Another coil is now wound and stripped from coil form (48) onto coil retainer form (62) and blade (76). Plate (70) is then indexed again and the coil winding and stripping process is repeated. Wire (42) is not cut between coils but is continuous from coil to coil. Because coil retainer form elements (62) are located outside of the circumferential insertion blade array, the tension forces on wire (42) as it is pulled from one completed coil to the next coil will not place distorting forces on blades (76) since the forces are absorbed by the very rigidly held coil retainer forms (62). Therefore the shape of the completed coils will be retained without the necessity of clamping the sections of wire between adjacent coils. The retainer assembly also prevents distortion and misalignment of blades (76).

Figure 15A:
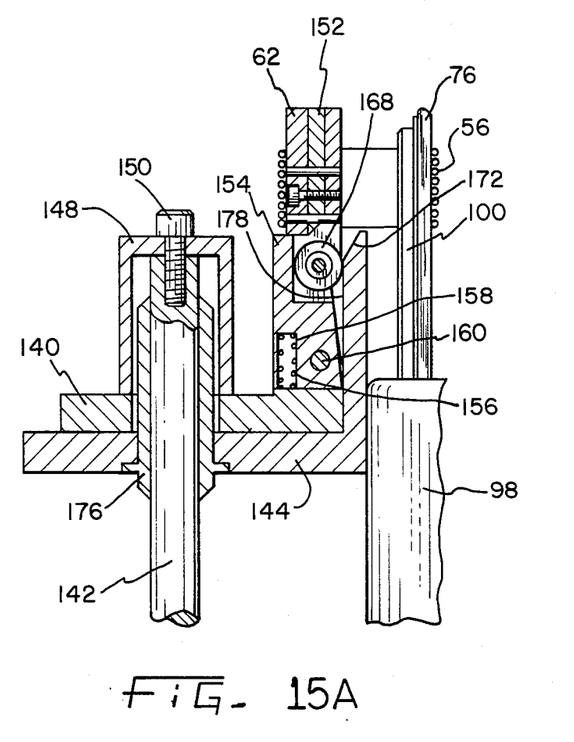
FIG. 15A is a partial enlarged side view of the coil placer tooling after the coils have been stripped from the coil form and onto the coil retainer and prior to the release of the coil retainer.
Figure 15B:
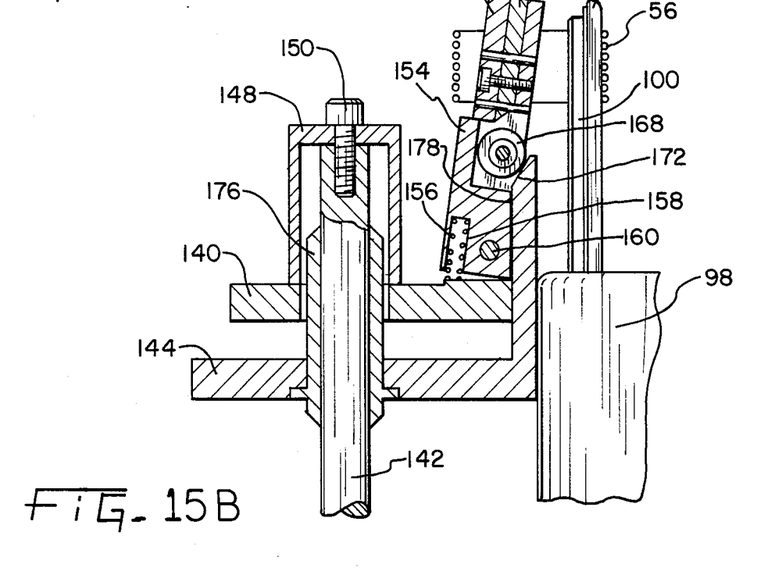
FIG. 15B is a partial enlarged side view of the coil placer tooling after the release of the coil retainer.
Figure 16:
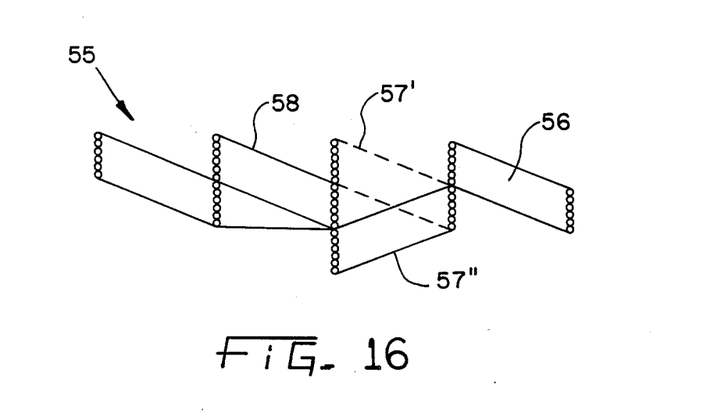
FIG. 16 is a diagrammatic view of a portion of the coils as they are being held on the coil retainer tooling prior to the insertion operation.

After a complete set of coils (55) has been wound and stripped onto the array of retainer forms and blades, wire (42) is cut and indexing table (18) is rotated to move placer tooling (34) including the completed set of coils (55) to the coil insertion station (16). A stator core (88) comprising an assembled stack of stator core laminations is located above and in alignment with blades (76). Blade pusher tube (80) and stripper pusher rod (124) are engaged by the activating mechanism located at insertion station (16) below table (18). At this point camming device (174) is activated to lower retainer form collapse ring (144) as best illustrated in FIGS. 12 and 15B. The lowering of collapse ring (144) allows rollers (168) to engage camming surface (172) thereby permitting springs (156) to cause retainer form supports (154) to pivot about pins (160). This causes retainer forms (62) to pivot inwardly thereby releasing the tension on the coils held thereon. The released coils are now held only by blades (76) since only the side portions of the coils are held in the gaps between adjacent blades. This position of coil (56) is shown in FIG. 15b. At this point blade pusher (78) is actuated to move blade pusher tube (80) upwardly and actuate blade holder (81). Blade holder (81) then moves blades (76) through the stator core bore to their coil insertion positions. The portions of coil (56) located on the inside of blades (76) will be carried partly into stator core (88). When blades (76) are completely in their insertion positions the tips of blades (76) will protrude above the stator core sufficiently to protect the coils from damage by the sharp edges of the stator core during the insertion of the coils into the stator core slots.

Stripper (120) and wedge pusher (128) are now activated by the movement of stripper pusher rod (124) by means of stripper pusher (126). As stripper (120) travels upwardly, the finger portions of stripper (120) which extend into the gaps between blades (76) will engage the side turn portions of the coils to force them outwardly and insert them into the core slots (89). The end turn portions of the coils which are located inside blades (76) will be moved upwardly through the stator core. At this point the orientation of the coil will be as shown at (56"). As the stripper continues its travel, the frustoconical surface (121) of stripper (120) will force the upper portion of coil (56) outwardly. The coil can then be finished manually to its finished position as shown at (56''').

Simultaneously with the insertion of the coils into core 88 wedges (180) will have been inserted into the core slots by means of wedge pusher plate (128) and fingers (129) thereof. Thus both the coils and the wedges are inserted simultaneously. By referring to FIG. 7, wedges (87) are shown located after their insertion into the stator core slots. FIG. 7 also illustrates the orientation of coils (56", 57" and 58") after insertion into core (88) but prior to the coil finishing operation It is therefore clearly shown that by the pivoting orientation of the coil retainer forms (62) and the location of forms (62) outside of blades (76) the disadvantages of the prior art winding and insertion equipment have been overcome. Furthermore, by the utilization of wide blades including alignment keys a blade structure is provided which is much more rigid and able to handle relatively heavy wire.

While this invention has been described as having a preferred design it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. Apparatus for winding and inserting coils in the slots of a stator core comprising:
   coil winding tooling including a coil winding form, means for winding coils on said winding form, and a coil form stripper for stripping said coils from said form;
   coil placer means including a plurality of blades, said placer means being relatively rotatable with respect to said winding tooling;
   coil retainer means disposed radially outside said blades for receiving a coil from said coil winding form and for retaining said coil thereon during relative rotation of said placer means with respect to said winding tooling; and
   stripper means operatively associated with said blades for stripping said coils from said blades and for inserting said coils into the slots of a stator core.

2. The apparatus according to claim 1 wherein said coil retainer means is collapsible and includes a radially inwardly movable retainer form which is selectively movable to release said coils.

3. The apparatus according to claim 1 wherein said coil retainer means includes a pivotable retainer form, said pivotable form having a coil retaining position and a coil releasing position, said pivotable coil retainer form being retained in said retaining position by a selectively movable support means, whereby movement of said support means causes pivoting movement of said coil retainer form into said coil releasing position for releasing said coils.

4. The apparatus according to claim 1 wherein said coil retainer means includes a coil retainer form which has a coil retaining position and a coil releasing position and further includes a camming means, said camming means adapted to cooperate with a camming surface of a coil retainer support means for selectively camming said coil retainer form into said coil retaining and coil releasing positions.

5. The apparatus according to claim 1 wherein said coil retainer means comprises a circular array of a plurality of coil retainer forms respectively operatively associated with said plurality of blades.

6. The apparatus according to claim 5 wherein said circular array of coil retainer forms includes a camming means and wherein said coil retainer forms are inwardly pivotable for releasing said coils, said camming means cooperatively associated with a cam actuating means for pivoting said coil retainer forms and for releasing said coils.

7. The apparatus according to claim 5 wherein each of said plurality of retainer forms includes a roller, said apparatus further including a support ring having a first camming surface for cooperating with said rollers to maintain said coil retainer forms in coil retaining positions, and having a second camming surface for cooperating with said rollers to pivot said coil retainer forms and to release said coils.

8. The apparatus according to claim 5 wherein said coil winding form has a larger circumferential dimension than the combined circumferential dimension of one of said coil retainer forms and one of said blades whereby said coils may be circumferentially angularly disposed with respect to a horizontal plane on said coil retainer means.

9. The apparatus according to claim 1 wherein said retained coils are arranged in a circular array on said retainer means, each coil being disposed at an angle with respect to a horizontal plane whereby one end of each said coil may be stacked on an end of an adjacent said coil.

10. The apparatus according to claim 1 wherein each said blades spans a plurality of said stator core slots.

11. The apparatus according to claim 10 wherein said blades include keys, said keys received in the gaps between adjacent teeth of said stator for aligning said blades.

12. An apparatus for placing prewound coils into the slots of a stator core comprising:
   a plurality of blades arranged in a circular array;
   coil retainer means operatively associated with said array and located concentrically with and outside of said array for retaining said prewound coils; and
   stripper means disposed radially inwardly of and concentrically with said array for stripping said coils from said blades and for inserting said coils into said stator core slots.

13. The apparatus according to claim 12 wherein said coil retainer means is collapsible and includes movable means for selectively moving said retainer means to release said coils.

14. The apparatus according to claim 12 wherein said retainer means includes pivotable means, said pivotable means having a coil retaining position and a coil releasing position, said pivotable means retained in said retaining position by a support means, said support means movable for causing said pivotable means to pivot into said coil releasing position for releasing said coils.

15. The apparatus according to claim 12 wherein said coil retaining means has a coil retaining position and a coil releasing position said apparatus further including camming means, said camming means cooperating with a coil retainer support having a camming surface thereon for selectively positioning said retainer means into said coil retaining and coil releasing positions.

16. The apparatus according to claim 12 wherein said coil retainer means comprises a circular array of a plurality of coil retainer forms respectively operatively associated with said plurality of blades.

17. The apparatus according to claim 12 wherein said circular array of coil retainer forms includes camming means and wherein said coil retainer forms are radially inwardly pivotable for releasing said coils, said camming means cooperatively associated with a camming surface for pivoting said retainer elements and for releasing said coils.

18. The apparatus according to claim 12 wherein said coil retainer means includes a plurality of retainer elements and wherein each of said plurality of retainer elements includes a roller, said apparatus further including a support ring having a first camming surface for cooperating with said rollers to maintain said retainer elements in coil retaining positions, and having a second surface for cooperating with said rollers to permit said elements to pivot and to release said coils.

19. The apparatus according to claim 12 wherein said blades span a plurality of stator core slots.

20. The apparatus according to claim 19 wherein said blades include keys for engaging the gaps between adjacent teeth of said stator core and for aligning said blades.

21. Apparatus for winding and placing coils into selected slots of a stator core comprising:
an indexing table movable with respect to a coil winding and coil inserting station;
coil winding tooling operatively disposed at said coil winding station and including a coil winding form, flyer means for winding coils on said coil winding form and coil form stripping means for stripping coils from said form;
rotatable coil placer means including a circular array of coil insertion blades and a circular array of coil retainer means disposed concentrically with and outside said blade array;
said placer means operatively disposed with respect to said coil form to receive stripped coils from said coil form, said coil placer means being rotatably indexed after receiving a stripped coil to dispose an empty coil retainer means below said coil form for receiving a further stripped coil, said table indexing said placer tooling to said inserting station when a complete set of coils has been stripped onto said retaining means; and
stripper means operative to strip said coils from said blades and for inserting said coils into the selected slots of a stator core.

22. The apparatus according to claim 21 wherein said coil retainer means is collapsible and includes a pivotable element pivotable inwardly toward said blades to release said coils.

23. The apparatus according to claim 21 wherein said retainer means includes pivotable elements, said pivotable elements having coil retaining positions and coil releasing positions, said pivotable elements retained in said retaining positions by a support means, said support means movable to permit said pivotable elements to pivot into said coil releasing positions for releasing said coils.

24. The apparatus according to claim 21 wherein said array of retainer means has a coil retaining position and a coil releasing position, said apparatus further including a camming means operatively associated with a coil retainer support means having a camming surface thereon for selectively causing said coil retainer elements to be positioned into said coil retaining and coil releasing positions.

25. The apparatus according to claim 21 wherein said circular array of coil retainer means includes camming means and wherein said coil retainer means are inwardly pivotable for releasing said coils, said camming means cooperatively associated with a camming surface for pivoting said retainer means and for releasing said coils.

26. The apparatus according to claim 21 wherein said retainer means includes a plurality of coil retainer elements, each of said plurality of retainer elements including a roller, said apparatus further including a support ring having a first camming surface for cooperating with said rollers to maintain said retainer elements in a coil retaining position, and having a second surface for cooperating with said rollers to permit said elements to pivot and to release said coils.

27. The apparatus according to claim 21 wherein said coil winding form has a greater circumferential dimension than the circumferential dimension of said retainer means, whereby said coils may be circumferentially angularly disposed on said retainer means with respect to a horizontal plane and whereby said coils form a cylindrical coil array with the height of said cylindrical coil array being approximately equal to the height of each said coils.

28. The apparatus according to claim 21 wherein said coils are arranged in a cylindrical array on said retainer means, each coil being disposed at an angle with respect to a horizontal plane in the circumferential direction whereby one end of each said coil may be stacked on an end of an adjacent coil.

29. The apparatus according to claim 21 wherein each said blades spans a plurality of stator core slots.

30. The apparatus according to claim 29 wherein said blades include keys for engaging the gaps between successive teeth of said stator core for aligning said blades.

31. The apparatus according to claim 21 including aligning means operatively associated with said coil winding tooling for aligning said coil winding form with said coil retainer means.

32. The method of inserting prewound coils into the slots of a stator core comprising:
retaining said coils on a plurality of circumferentially arranged blades and a plurality of coil retainer forms; and
stripping said coils from said blades and said retainer forms and inserting said coils into said stator core slots.

33. The method according to claim 32 wherein said retained coils comprise a circular array of coils, and wherein each said coil is angularly oriented with respect to a horizontal plane.

34. The method according to claim 33 wherein said coils have a larger circumferential dimension than the circumferential dimension of a combined blade and retainer form.

35. The method of claim 32 wherein said retainer forms are disposed concentrically with and outside said array of blades, the method further including the step of collapsing said retainer forms inwardly toward said blades to release said coils before said coils are stripped from said blades.

36. The method of winding and inserting coils into the slots of a stator core comprising:
winding a first coil on a coil form;
stripping said first coil from said coil form onto a retaining means comprising a circular array of blades and coil retainer forms disposed circumferentially with and outside said array;
rotatably indexing said retaining means and said first coil;
winding a second coil on said coil form;
stripping said second coil onto said retaining means;
arranging a stator core coaxially with and adjacent to said retaining means;
moving said blades axially into the bore of said stator core; and
moving a stripper axially through said array of blades and said core to strip said first and second coils from said blades and to insert the coils into said slots.

37. The method of claim 36 wherein said coil retainer form is collapsed radially inwardly toward said blades to release said coils before said blades are moved axially into the bore of said stator core.

* * * * *